United States Patent [19]

Larsson et al.

[11] Patent Number: 4,852,136
[45] Date of Patent: Jul. 25, 1989

[54] METHOD AND DEVICE FOR TIGHTNESS CONTROL OF A JOINT

[75] Inventors: Lennart Larsson, Malmö; Bo Ullman, åhus; Håkan Ohlsson, Lund, all of Sweden

[73] Assignee: AB Akerlund & Rausing, Sweden

[21] Appl. No.: 122,289

[22] Filed: Nov. 18, 1987

[30] Foreign Application Priority Data

Nov. 27, 1986 [SE] Sweden .............................. 86/05083

[51] Int. Cl.$^4$ .......................... B07C 5/02; G01B 15/06
[52] U.S. Cl. ........................................ 378/58; 378/57; 250/358.1; 250/360.1
[58] Field of Search .......................... 378/58.57, 54.55; 250/359.1, 358.1, 360.1, 223 R; 209/576, 587, 588, 589, 590; 356/428; 277/2

[56] References Cited

U.S. PATENT DOCUMENTS

| | | | |
|---|---|---|---|
| 3,160,760 | 12/1964 | Fry et al. | 356/428 |
| 3,484,685 | 12/1969 | Murley | 209/590 |
| 3,819,943 | 6/1974 | Ishibashi et al. | |
| 3,825,750 | 7/1974 | Mayase et al. | 356/428 |
| 3,874,144 | 4/1975 | Feigel | 53/54 |
| 3,880,750 | 4/1975 | Butler et al. | 356/428 |
| 3,917,947 | 11/1974 | Fenton | 209/589 |
| 4,497,409 | 2/1985 | Chong | 356/428 |
| 4,542,520 | 9/1985 | Nelson | 378/58 |
| 4,694,479 | 9/1987 | Bacskai et al. | 378/58 |

FOREIGN PATENT DOCUMENTS

2260767 5/1976 Fed. Rep. of Germany .
2805656 8/1979 Fed. Rep. of Germany ...... 209/590

OTHER PUBLICATIONS

Lampi, Rauno A., et al., *Automatic Infared Radiometric Scanning to Detect Flexible Package Seal Defects*, IEEE Transactions on Industrial Electronics and control Instrumentation, vol. IECI-20, No. 4, Nov. 1973, pp. 205-212.

Primary Examiner—Carolyn E. Fields
Assistant Examiner—Joseph A. Hynds
Attorney, Agent, or Firm—Lerner, David, Littenberg, Krumholz & Mentlik

[57] ABSTRACT

A method and a device for inspecting a joint such as the joint at the rim of a container. Radiant energy is directed into a small area of irradiation on the joint and the container rim is moved relative to the radiant energy so that the area of irradiation moves in one direction along the rim. Additionally, the area of irradiation is scanned crosswise to the one direction to move the area of irradiation across the width of the joint. Radiant energy reflected from the area of irradiation or transmitted through the area of irradiation is detected. This radiant energy indicates the characteristics of the joint. The characteristics indicated by the radiant energy are compared to predetermined set value characteristics to detect product residue or other defects in the joint.

9 Claims, 2 Drawing Sheets

METHOD AND DEVICE FOR TIGHTNESS CONTROL OF A JOINT

FIELD OF THE INVENTION

The present invention relates to a method and a device for the control of joints or seams, especially seals of packages.

BACKGROUND OF THE INVENTION

Frequently, there is a need to carry out such control with a high speed, sometimes also in line with the manufacture or mounting. The environmental conditions may be very difficult from a contamination point of view. Additionally, the type of material of the object or objects forming the joint may vary considerably and fall within the entire range from organic materials to inorganic materials or combinations of such materials.

Control systems are previously known for, for instance, weld joints in metal objects, where an energy rich radiation is used, for instance X-ray radiation, which in one way or the other penetrates the joints and gives an indication, for instance an X-ray image, of the actual condition. The "resolution capacity" of said system is strictly dependent on the type of material—basically, metal is the only type of material possible to use, at least at high speeds.

Previously, it has been especially difficult to examine the quality of joints formed in plastics material, especially when such examination has been carried out in an application where the joint defines a space containing an organic substance, for instance sealed closures or other sealing arrangements for food packages. Previously, the organic structure of the material forming the joint and the organic product enclosed inside the joint has caused problems when attempts were made to detect possible product residues in the joint.

OBJECT OF THE INVENTION

The object of the present invention is to eliminate said deficiencies of known methods and devices and offer a more useful alternative, which is well suited for tightness control of packages, especially within the canned food industry.

SUMMARY OF THE INVENTION

The invention provides a method for the control of a joint between a first element, which covers an opening in a second element, and the marginal region of the opening in said second element, and where a rim is arranged around the opening and includes said joint and a radiation or ultra sound source is arranged at one side of the rim for emitting radiation or wave energy having a capacity of penetrating the rim and/or being reflected at the joint and a detector device for detecting said radiation or wave energy is placed at either side or both sides of the rim.

The method is characterized in that the radiation source is arranged for illuminating or transferring wave energy to a small dot of the joint, that both elements and the radiation source including the detector device are brought into a relative rotational movement around an axis generally perpendicular to the plane of the opening, that said dot is brought to carry out a scanning movement crosswise the joint width during said rotation, that the detector device is arranged for registering the characteristics of the detected radiation, and that said characteristics is compared to a pre-determined characteristics.

The relative placement of the radiation source and the detector device may, according to the present invention, be such that the detector responds to transmitted and/or reflected radiation, i.e. radiation that is reflected at the border layer formed by said joint.

The relative movement between said two elements and the radiation source/detector may be accomplished by means of a fixed or moveable radiation source/detector.

Preferably, the detector device is placed at such a large distance from the joint that an magnifying effect is obtained.

The method according to the present invention has turned out to be especially suited as a tightness control of a packaging container closed by at least one end piece.

The control is especially well suited in cases where the joint comprises plastics material and the container contents is an organic material, for instance a food product.

In one embodiment a mini focus or micro focus X-ray equipment is used as radiation source. According to the invention, the term radiation source comprises any type of energy and frequencies, including also ultrasound, heat radiation, electromagnetic radiation, etc.

The invention also provides a device for control of a joint between a first element, which covers an opening in a second element, and the marginal region of the opening in said second element, and where a rim is formed around the opening and includes said joint.

The device is characterized in that a radiation source is arranged such that it illuminates a small dot of the joint from either side thereof, by a detector device placeable at the other side of the joint, by a scanner device for providing a scanning of the dot crosswise the width of the joint, by a device for rotation of said first and second elements around an axis generally perpendicular to the plane of the opening, and by means responsive to the detector device for evaluating the characteristics of the detected radiation.

In a preferred embodiment the radiation source comprises a mini focus X-ray device.

In said embodiment the distance between the joint and the detector device preferably is such that the mini focus device gives a magnifying effect.

DESCRIPTION OF A PREFERRED EMBODIMENT

Figure 1:
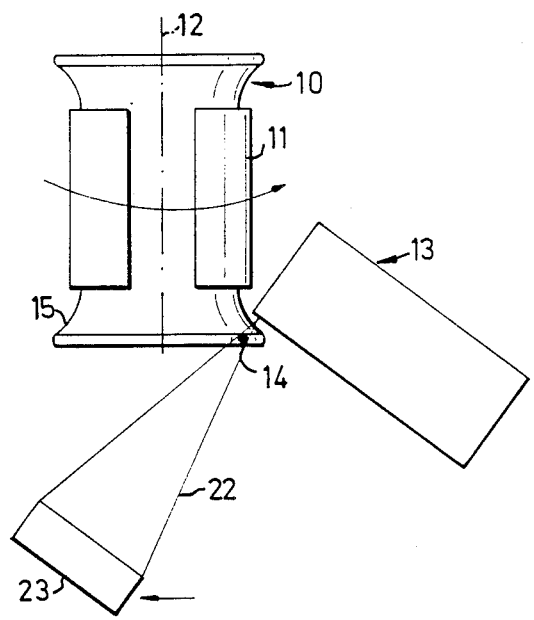
FIG. 1 schematically shows a device for carrying out the method according to the present invention.
Figure 2:
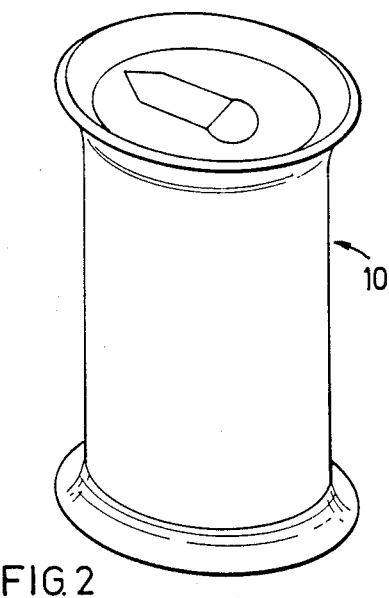
FIG. 2 shows a packaging container of a structure well suited according to the invention.

The reference numeral 10 denotes a packaging container for food products, for instance a package of the canned food type, which is supported by a support 11 and arranged for rotation around an axis 12. The speed of the rotation movement is high, in the embodiment shown up to a rotational speed corresponding to three can passages per second through the control station where the rotation takes place.

In FIG. 1 there has been shown schematically a radiation source 13 for radiation of sufficient energy for penetrating a rim (shown in FIG. 3) at the end of the package container. The radiation source 13 may be an X-ray source, for instance of the mini or micro focus X-ray type.

By means of the X-ray source, a small point 14 of the rim is illuminated in the area thereof where a joint or seal exists between an end piece and the container casing.

Figure 3:
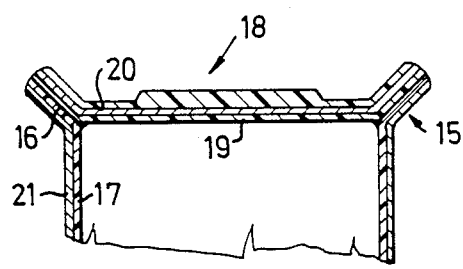
FIG. 3 is a partial cross section of the top of the packaging container.

The rim 15 appears more clearly from FIG. 3, where a joint or seal 16 exists between the inner layer 17, which is of plastics material, of the container 10 and the inner layer 19, which is also of plastics material, of the end element 18. Thin metal foil layers, for instance aluminum layers 20, 21 in the end element and the casing, respectively, act as gas and vapour penetration barriers. Of course, there may also be other types of barrier layers, for instance metallized plastics films or laminates having oxygen-, vapour- and gas barrier characteristics.

However, it is recognized that the joint or the seal 16, i.e. the seam between the casing and the end element, which should guarantee tightness and maintain barrier characteristics, mainly comprises organic plastics material. As the packaging contents is a food product, i.e. a substantially organic material, such contents will be difficult to trace or detect in the seal 16 by means of traditional equipment, because the conventional through-illuminating methods are not able to detect small or minimum size products residues in the seal which residues, no doubt, break the integrity of the seal.

By means of the arrangement and the method according to FIG. 1, it is guaranteed, as already mentioned, that a small point or dot 14 of the rim 15 will be illuminated by a radiation source 13. In said radiation source there is included also a scanner (not shown), which gives the said point a scanning movement crosswise the joint. By simultaneous rotation of the container 10 around the axis 12 there is obtained an accurate, point by point registration of the characteristics of the joint or seal by letting the radiation 22, i.e. the radiation that penetrates the rim, hit a detector device 23, for instance a multiple anode photo multiplier. Furtheron, the arrangement is such that said device is placed at a sufficient distance from the rim 15 for taking advantage of a magnifying effect from each one of the small dots that are "illuminated" by means of the radiation source 13.

By including a comparator device in the arrangement in FIG. 1, it is possible to continuously compare a set value characteristic with an actual value characteristic, which the detector presents at each individual moment. In this way it will be easy to detect very small weakenings of the seal, for instance originating from one single organic fibre from a food product in the container, and it should be noted that the control may be carried out by a very high speed and directly in line with the filling operation.

Although the invention has been exemplified by reference to a specific embodiment it is realized that modifications and alternatives are possible within the scope of the claims.

Within such scope there is for instance possible to detect radiation reflected at a joint, to detect both reflected and transmitted radiation, and to use other radiation sources than the ones falling under the general definition previously given.

We claim:

1. A method of inspecting the integrity of a joint between two elements of a packaging container defining a rim with two sides, comprising the
   (a) directing radiant energy energy into said rim from a source on one side thereof so that said radiant energy impinges on said joint creating an area of irradiation smaller than the width of the joint;
   (b) moving said container relative to said radiant energy so that said area of irradiation moves in one direction along said rim;
   (c) scanning said joint crosswise to said one direction with said area of irradiation during said movement so that said area of irradiation moves across the width of the joint;
   (d) detecting radiant energy transmitted through said area of irradiation so that the detected radiant energy indicates the characteristics of the joint; and
   (e) comparing said characteristics to a predetermined set value characteristic to detect any product residue or other defects in said joint.

2. A method as in claim 1, wherein the detector device is placed at such a distance from the joint that a magnifying effect is obtained.

3. A method as in claim 1, wherein said inspection is carried out as a tightness control of a packaging container, which is closed by at least one end element.

4. A method as in claim 3, wherein said tightness control is carried out on a filled container.

5. A method as in claim 1, wherein a mini or micro focus X-ray equipment is used as a radiation source.

6. A method as in claim 3, wherein in the tightness control is carried out on a joint substantially comprising plastics material.

7. A device for inspecting the integrity of a joint between two elements of a packaging container defining a rim with two sides, comprising:
   (a) radiation source means for directing radiant energy on to an area of irradiation on said joint smaller than the width of the joint from either side of said rim;
   (b) means for moving said container relative to said radiation source means so that said area of irradiation moves along said rim in one direction;
   (c) a scanner device for scanning said joint with said area of irradiation in a direction crosswise to said one direction so that said area of irradiation moves across the width of the joint;
   (d) a detector device for detecting radiant energy transmitted through said area of irradiation to indicate the characteristics of the joint; and
   (e) a comparator device for comparing said characteristics to a predetermined set value characteristic to detect any product residue or defects in the joint.

8. A device as in claim 7, wherein said radiation source means comprises a mini focus X-ray device.

9. A device as ain claim 8, wherein the distance between the joint and the detector device is sufficient for the mini focus device to give a magnifying effect.

* * * * *